(12) United States Patent
Thomen et al.

(10) Patent No.: US 9,850,761 B2
(45) Date of Patent: Dec. 26, 2017

(54) BELL MOUTH INLET FOR TURBINE BLADE

(71) Applicant: United Technologies Corporation, Hartford, CT (US)

(72) Inventors: Seth J. Thomen, Colchester, CT (US); Wieslaw A. Chlus, Wethersfield, CT (US)

(73) Assignee: United Technologies Corporation, Farmington, TX (US)

( * ) Notice: Subject to any disclaimer, the term of this patent is extended or adjusted under 35 U.S.C. 154(b) by 156 days.

(21) Appl. No.: 14/762,582

(22) PCT Filed: Jan. 24, 2014

(86) PCT No.: PCT/US2014/012884
§ 371 (c)(1),
(2) Date: Jul. 22, 2015

(87) PCT Pub. No.: WO2014/120565
PCT Pub. Date: Aug. 7, 2014

(65) Prior Publication Data
US 2015/0369055 A1 Dec. 24, 2015

Related U.S. Application Data

(60) Provisional application No. 61/760,253, filed on Feb. 4, 2013.

(51) Int. Cl.
*F01D 5/18* (2006.01)
*F01D 5/08* (2006.01)
(Continued)

(52) U.S. Cl.
CPC ............... *F01D 5/186* (2013.01); *F01D 5/02* (2013.01); *F01D 5/081* (2013.01); *F02C 3/04* (2013.01);
(Continued)

(58) Field of Classification Search
CPC .......... F01D 5/18; F01D 5/3007; F01D 5/081; F01D 5/14; F01D 5/189; F01D 5/303;
(Continued)

(56) References Cited

U.S. PATENT DOCUMENTS

| 4,604,031 A | 8/1986 | Moss et al. |
| 5,403,156 A | 4/1995 | Arness et al. |

(Continued)

FOREIGN PATENT DOCUMENTS

EP 1923537 A2 5/2008

OTHER PUBLICATIONS

International Preliminary Report on Patentability for International Application No. PCT/US2014/012884 dated Aug. 13, 2015.
International Search Report and Written Opinion for International Application No. PCT/US2014/012884 dated May 14, 2014.

*Primary Examiner* — William H Rodriguez
(74) *Attorney, Agent, or Firm* — Carlson, Gaskey & Olds, P.C.

(57) ABSTRACT

An airfoil assembly for a gas turbine engine is disclosed and includes a platform portion defining a portion of a gas flow path and a root portion for attachment of the turbine airfoil, the root portion including a bottom surface including a bottom area and a plurality of inlets that define a total inlet area as a ratio of the inlet area to the bottom area. An airfoil extends from the platform and including a plurality of cooling air passages in communication with the plurality of inlets.

14 Claims, 4 Drawing Sheets

(51) Int. Cl.
*F01D 5/02* (2006.01)
*F02C 3/04* (2006.01)
*F02C 7/18* (2006.01)

(52) U.S. Cl.
CPC ............ *F02C 7/18* (2013.01); *F05D 2220/32* (2013.01); *F05D 2230/10* (2013.01); *F05D 2250/23* (2013.01); *F05D 2250/232* (2013.01); *F05D 2250/27* (2013.01); *F05D 2250/711* (2013.01); *F05D 2260/202* (2013.01); *Y02T 50/676* (2013.01); *Y10T 29/49343* (2015.01)

(58) Field of Classification Search
CPC ............... F01D 5/141; F01D 5/143; F01D 5/186–5/188; F01D 5/187; F05D 2260/20; F05D 2260/202; Y10T 29/49343; Y10T 29/49341
See application file for complete search history.

(56) References Cited

U.S. PATENT DOCUMENTS

| | | | |
|---|---|---|---|
| 5,738,489 A * | 4/1998 | Lee | F01D 5/18 |
| | | | 415/177 |
| 6,390,775 B1 | 5/2002 | Paz | |
| 6,416,275 B1 | 7/2002 | Itzel et al. | |
| 6,491,496 B2 * | 12/2002 | Starkweather | F01D 5/187 |
| | | | 415/115 |
| 6,933,459 B2 * | 8/2005 | Helder | B23K 11/002 |
| | | | 219/117.1 |
| 6,974,306 B2 | 12/2005 | Djeridane et al. | |
| 7,632,071 B2 | 12/2009 | Charbonneau et al. | |
| 8,016,547 B2 | 9/2011 | Propheter-Hinckley | |
| 8,105,031 B2 | 1/2012 | Trindade et al. | |
| 2005/0265841 A1 | 12/2005 | Magowan et al. | |
| 2006/0083614 A1 | 4/2006 | Cunha et al. | |
| 2007/0140848 A1 * | 6/2007 | Charbonneau | F01D 5/081 |
| | | | 416/96 R |
| 2007/0189898 A1 | 8/2007 | Hooper et al. | |

* cited by examiner

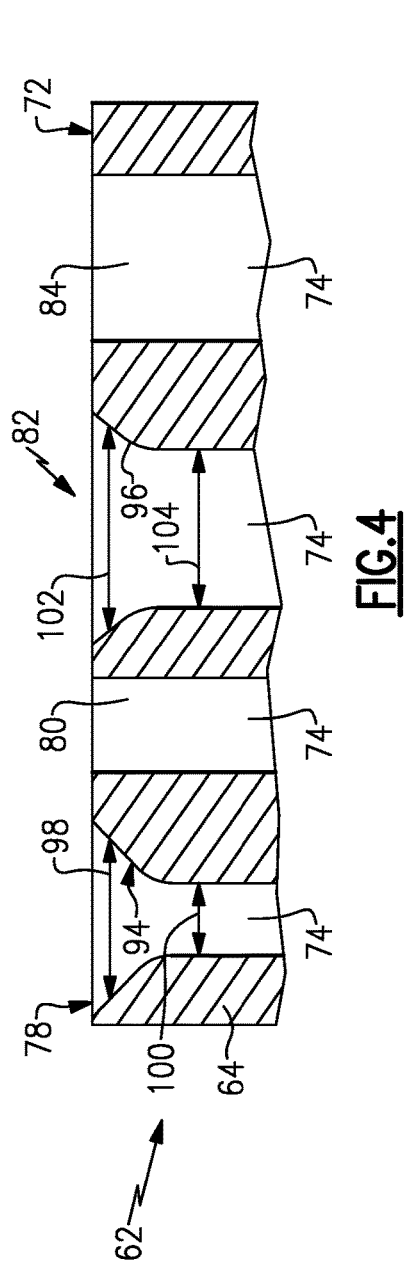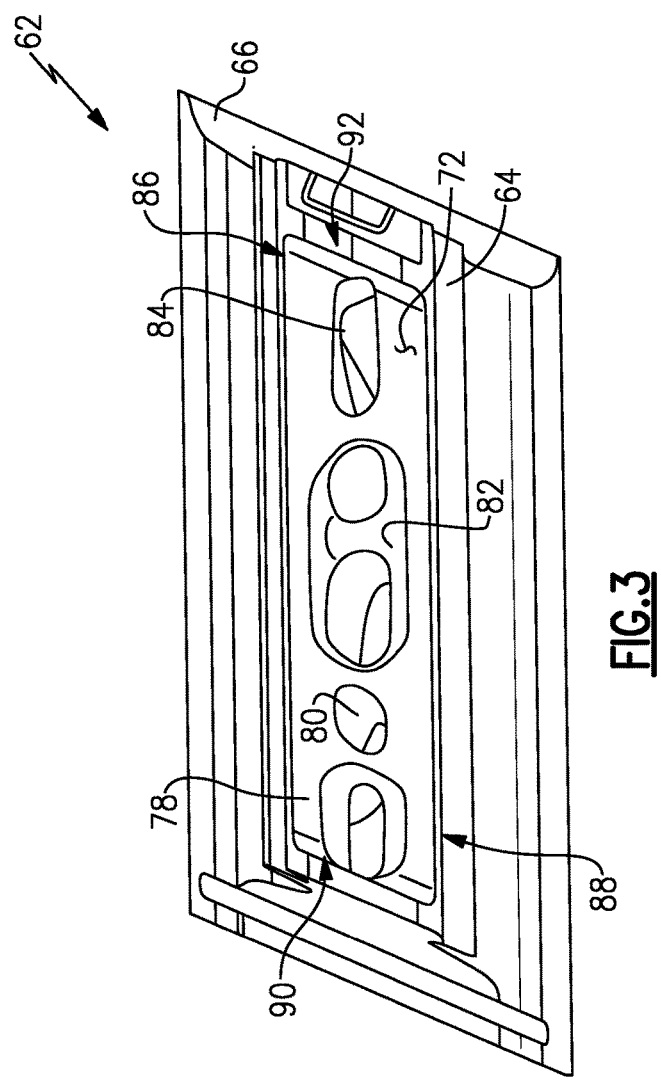

A gas turbine engine typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor. The compressor section typically includes low and high pressure compressors, and the turbine section includes low and high pressure turbines.

Turbine blades and vanes perform in an extreme temperature environment and are therefore often provided with cooling airflow. Turbine blades and vanes typically include cooling air passages that direct air from inlets within the mount or root portions through to cooling air openings within the airfoils surfaces. Restrictions to cooling airflow into the blade or vane can limit cooling effectiveness. Accordingly, it is desirable to develop and design airflow passages and inlets that improve cooling airflow.

BELL MOUTH INLET FOR TURBINE BLADE

BACKGROUND

SUMMARY

A airfoil assembly for a gas turbine engine according to an exemplary embodiment of this disclosure, among other possible things includes a platform portion defining a portion of a gas flow path, an airfoil extending from the platform including a plurality of cooling air channels, and a root portion for attachment of the airfoil. The root portion includes a bottom surface including a bottom area and a plurality of inlets for communicating air to the plurality of cooling air channels. The plurality of inlets define a total inlet area such that a ratio of the inlet area to the bottom area is between about 0.20 and 0.45.

In a further embodiment of the foregoing airfoil assembly, the ratio of the inlet area to the bottom area is between about 0.25 and 0.40.

In a further embodiment of any of the foregoing airfoil assemblies, at least one of the plurality of inlets includes an opening area at the bottom surface greater than a passage area spaced apart from the opening area.

In a further embodiment of any of the foregoing airfoil assemblies, the plurality of inlets includes open inlets and metered inlets. The metered inlets includes a metering plate with a plurality of meter openings attached over the metered inlets.

In a further embodiment of any of the foregoing airfoil assemblies, the plurality of metered openings defines a metered opening area and a ratio of the metered opening area to the total opening area is between about 0.7 and about 0.9.

In a further embodiment of any of the foregoing airfoil assemblies, the bottom surface is bounded between first and second sides that extend between forward and aft sides.

In a further embodiment of any of the foregoing airfoil assemblies, the bottom forward and aft sides are disposed at a non-normal angle relative to plane perpendicular to an axis of the gas turbine engine.

In a further embodiment of any of the foregoing airfoil assemblies, the airfoil assembly includes a turbine blade supported within a turbine rotor.

A gas turbine engine according to an exemplary embodiment of this disclosure, among other possible things includes a compressor section disposed about an axis, a combustor in fluid communication with the compressor section, a turbine section in fluid communication with the combustor and driving the compressor section, and a turbine blade supported within the turbine section. The turbine blade includes a platform portion defining a portion of a gas flow path. An airfoil extends from the platform including a plurality of cooling passages, and a root portion for attachment of the turbine blade. The root portion includes a bottom surface including a bottom area and a plurality of inlets communicating with the plurality of cooling passages. The plurality of inlets define a total inlet area such that a ratio of the inlet area to the bottom area is between about 0.20 and 0.45.

In a further embodiment of the foregoing gas turbine engine, at least one of the plurality of inlets includes an opening area at the bottom surface greater than a passage area spaced apart from the opening area.

In a further embodiment of any of the foregoing gas turbine engines, the plurality of inlets includes open inlets and metered inlets. The metered inlets includes a metering plate with a plurality of meter openings attached over the metered inlets.

In a further embodiment of any of the foregoing gas turbine engines, the plurality of metered openings define a metered opening area and a ratio of the metered opening area to the total opening area is between about 0.7 and about 0.9.

In a further embodiment of any of the foregoing gas turbine engines, the bottom surface is bounded between first and second sides that extend between forward and aft sides.

In a further embodiment of any of the foregoing gas turbine engines, the bottom forward and aft sides are disposed at a non-normal angle relative to plane perpendicular to the axis of the gas turbine engine.

A method of manufacturing a turbine blade according to an exemplary embodiment of this disclosure, among other possible things includes generating a turbine blade structure including a root portion, a platform and an airfoil extending from the platform, forming a plurality of cooling air passages within the airfoil, forming a plurality of inlets through a bottom surface of the root portion for supplying the plurality of cooling air passages, wherein at least one of the inlets is formed to include a bell mouthed opening.

In a further embodiment of the foregoing method, the bottom surface includes a surface area and the plurality of inlets define an inlet area, with a ratio of the inlet area and the bottom area being between about 0.20 and 0.45.

In a further embodiment of any of the methods, includes defining the bell mouth with a first opening area at the bottom surface that is greater than an area of one the passages spaced apart passage area spaced apart from bottom surface.

In a further embodiment of any of the methods, includes attaching a metering plate of at least one of the plurality of inlets to define a metered area, with a ratio of the metered area to the inlet area being between about 0.7 and about 0.9.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a bottom view of an example turbine blade.

FIG. 4 is a cross-section of the example turbine blade root.

DETAILED DESCRIPTION

Figure 1:
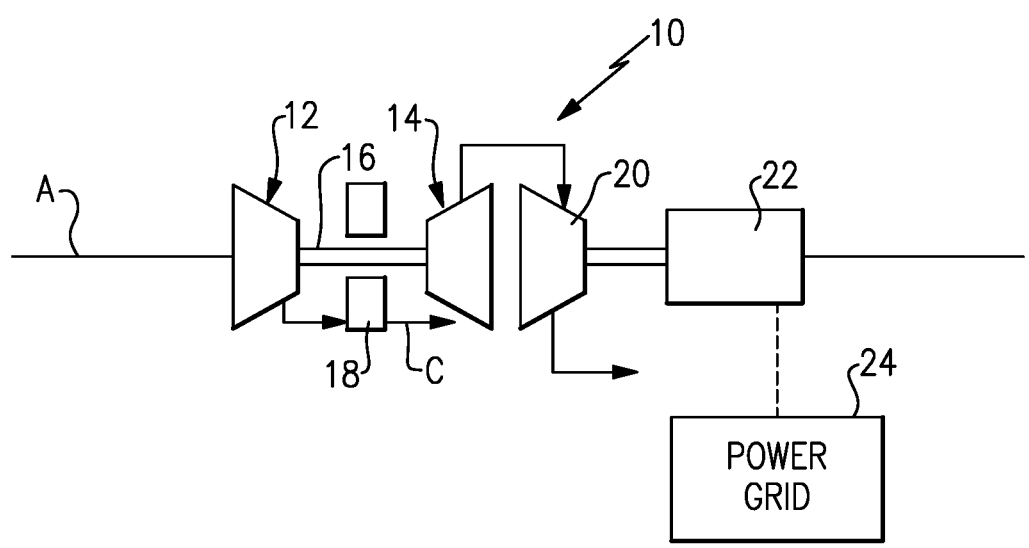
FIG. 1 is a schematic view of an example industrial gas turbine engine.

A schematic view of an industrial gas turbine engine 10 is illustrated in FIG. 1. The engine 10 includes a compressor section 12 and a turbine section 14 interconnected to one another by a shaft 16. A combustor 18 is arranged between the compressor and turbine sections 12, 14. Compressed air from the compressor section 12 is mixed with fuel in the combustor 18 and ignited to generate a high energy core flow C that expands through the turbine section 14. A generator 22 is rotationally driven by a shaft coupled to the turbine 14 or uncoupled via a power turbine 20, which is connected to a power grid 24. It should be understood that the illustrated engine 10 is highly schematic, and may vary from the configuration illustrated. Moreover, although a ground based turbine engine 10 is disclosed, propulsive gas turbine engines utilized in aircraft will also benefit from this disclosure and are within the contemplation of this disclosure.

The example turbine section 14 includes turbine blades 62 and vanes that translate the gas flow into rotation. As appreciated, in this example although a turbine blade is discussed and disclosed other blades and turbine vanes may also benefit from this disclosure.

Figure 2:
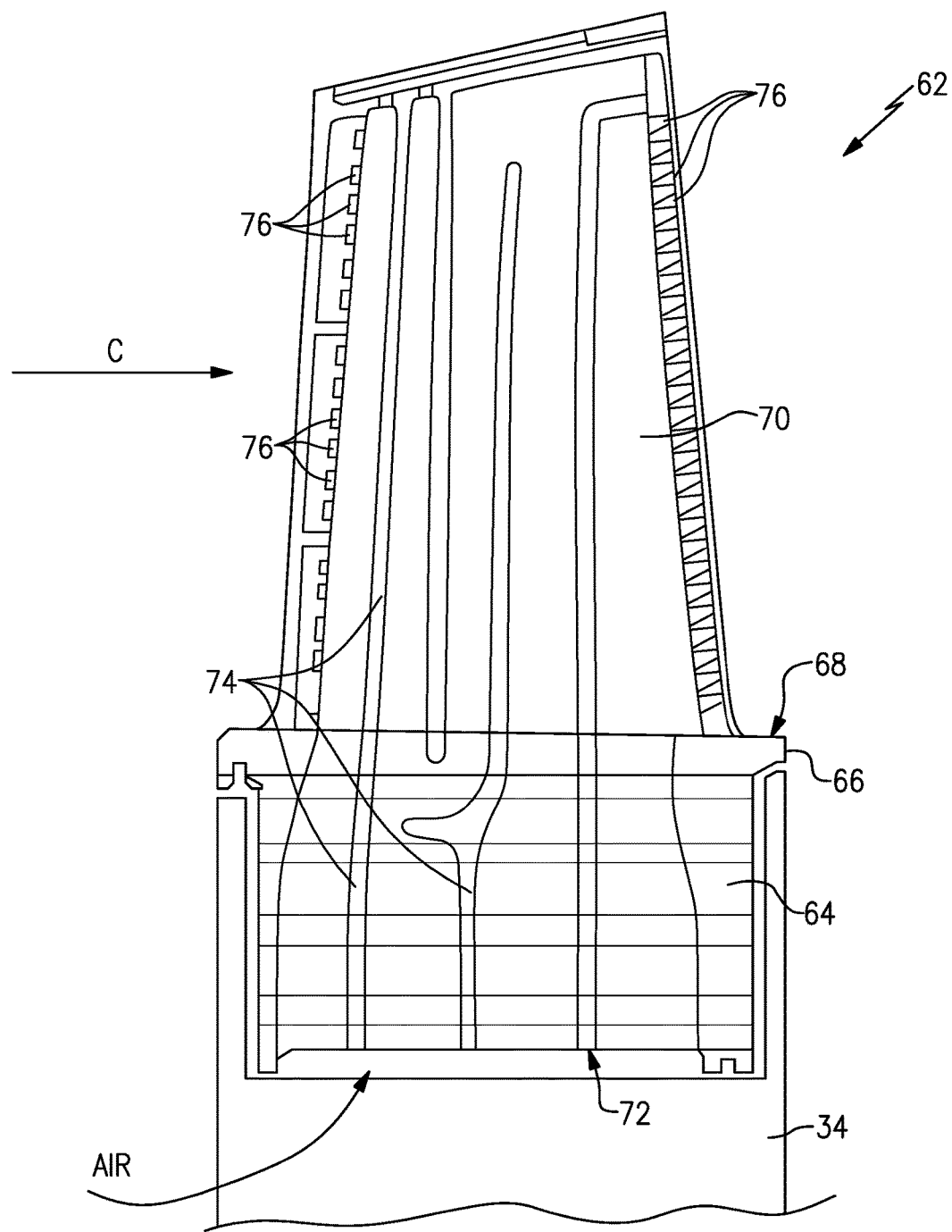
FIG. 2 is a side view of an example turbine blade.

Referring to FIG. 2, an example turbine blade 62 is shown and includes a platform 66 that defines a surface 68 of the gas path through the turbine section 14. A root portion 64 extends downward from the platform 66 and provides a shape and configuration for attachment to a turbine rotor 34. An airfoil 70 extends upward from the platform 66 and includes features that translate the core flow C through the turbine section 14 into rotary motion.

The root portion 64 includes a bottom surface 72. The bottom surface 72 includes a plurality of air inlets (FIG. 3) that supply cooling airflow to the plurality of passages 74 disposed throughout the turbine blade 62. The plurality of cooling air passages 74 supply air to cooling openings 76 illustrated here at the leading and trailing edges of the turbine blade 62. As appreciated, the passages 74 and the openings 76 are illustrative and may comprise other configurations and numbers as are utilized to provide desired cooling for the airfoil 70.

Cooling airflow into the passage is into the plurality of inlets provided at the bottom surface 72 of the root 64 provides the cooling airflow over the airfoil surface 70 during operating. Restrictions to cooling airflow from the inlets on the bottom surface 72 of the root portion 64 may result in the additional requirement for more cooling air. Accordingly, the more efficient and less restrictions provided to cooling airflow through the turbine rotor blade 62 the less energy required to be drawn from other portions of the gas turbine engine 10. Accordingly, improving cooling airflow through the turbine blade 62 can result in an overall improvement in gas turbine engine operation.

Referring to FIG. 3, the bottom surface 72 of the root 64 includes a forward side 90 and an aft side 92. A first side 86 and a second side 88 extends from the forward side 90 to the aft side 92. In this example, the forward and aft sides 90 and 92 are disposed at a non-normal angle relative to a plane normal to the axis A of the gas turbine engine. In other words, the forward side 90 and the aft side 92 are not disposed at 90° relative to the first and second sides 86, 88. As appreciated, the shape of the bottom surface 72 can vary within the contemplation of this disclosure. Moreover, in this example the aft and forward sides 90, 92 are parallel to one another. The first side 86 and the second side 88 complete the perimeter outline of the bottom surface 72 of the root portion 64. This perimeter outline defines a bottom surface area defined by the bottom surface 72.

A plurality of inlets disposed within the bottom surface 72 receive cooling air that is directed into the turbine blade 62. In the disclosed example, a first cooling air inlet 78, a second cooling air inlet 80, a third cooling air inlet 82, a fourth cooling air inlet 84 are disposed in the bottom surface 72 to receive cooling air and communicate that cooling air into the various passages 74 defined within the turbine blade 62.

The first cooling air inlet 78 and the third cooling air inlet 82 includes a bell mouth configuration. The bell mouth configuration includes a cross-sectional area 98 that is greater than a cross-sectional area 100 in a passage spaced apart from the bottom surface 72. In this example, the first inlet area 78 includes the bell mouth configuration 94 that defines the first inlet area 98 that is greater than the second inlet area 100 of a corresponding passage.

The third inlet 82 also includes a bell mouth configuration 96 that includes a first area 102 disposed along the surface 72 of the root 64. The area 102 is greater than an area 104 defined in a spaced apart orientation from the surface 92 of the root portion 64. The area 102 is greater than a second area indicated at 104 that is spaced apart from the bottom surface 72. The bell mouth configuration increases the area of the inlets 78 and 82 to alleviate and reduce flow restrictions of cooling air that are communicated into the passages 74.

In this example, each of the inlets 78, 80, 82, and 84 combine to define a total inlet area on the bottom surface 72. In this disclosure the area of the bottom surface is defined as that area defined within the boundary of the periphery of the bottom surface 72. That is the total area of the bottom surface 72 without consideration of the openings. In this example, the total inlet area is related to the total area of the surface 72 according to a ratio of between about 0.20 and 0.45. In another example, the total inlet area is related to the total area of the surface 72 according to a ratio of between about 0.25 and 0.40.

As appreciated, the specific ratio between the opening area defined by the inlet 78, 80, 82, and 84 relative to the area of the bottom surface 72 provides a ratio determined to communicate a desired rate of airflow into the turbine blade 62.

Figure 5:
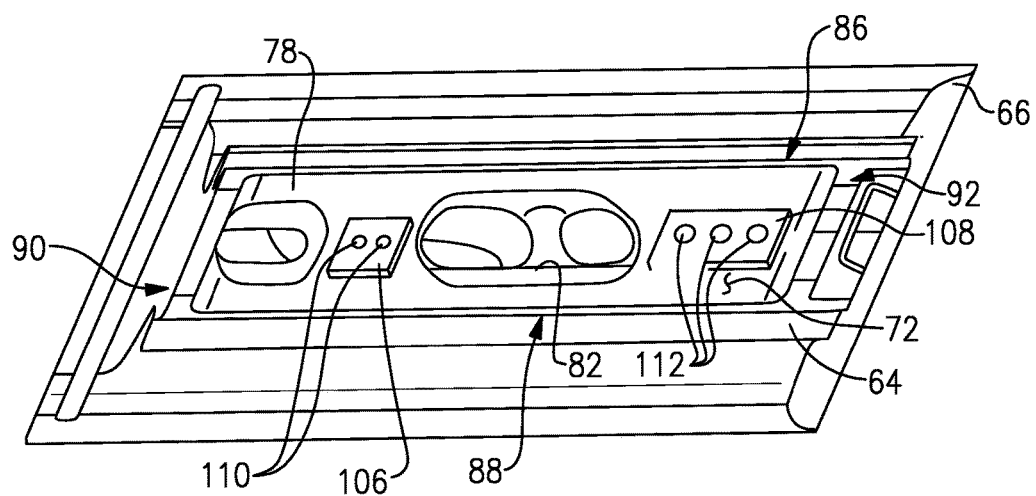
FIG. 5 is a bottom view of the example turbine blade including metering plates.

Referring to FIG. 5 with continued reference to FIGS. 3 and 4, the inlets 80 and 84 are covered by metering plates 106 and 108. The metering plates include metered openings 110 and 112 that define a metered inlet and restrict airflow through the fabricated open inlets or cored openings, within the turbine blade 62.

In this example, a core area that comprises the area of each of the inlets 78, 80, 82, and 84 without the metering plates as compared to a metered area with the metering plates 106,108 installed over the inlets 80 and 84 are related according to a ratio of the core area and the metered area between about 0.07 and about 0.09. In another disclosed embodiment, the ratio of the area of each of the inlets 78, 80, 82, and 84 without the metering plates as compared to the a metered area with the metering plates 106, 108 installed over the inlets 80,84 are related according to a ratio of the area to the metered area between about 0.70 and about 0.75. This ratio defines the airflow capacity through the turbine blade 62 and the airflow passages 74.

The bell mouths 94 and 96 that are provided in the inlets 78 and 82 increase the airflow area thereby reducing restrictions to airflow and improving cooling properties of the disclosed turbine blade. The example turbine blade is manufactured by generating the overall shape of the turbine blade in a casting or other process as is known. The inlets 78, 80, 82, and 84 are then formed including at least one of the inlets having the bell mouth configuration as is illustrated in FIG. 4.

The bell mouth configuration consists of rounded openings that include a greater opening area along the bottom surface 72 then would be provided should simple straight walled openings be utilized. A specific ratio of the bottom surface areas 72 to the total inlet area is provided according to the ratio of about 2 and 4.

Accordingly, once the turbine blade overall shape is generated metering plates 106 and 108 are installed to restrict airflow through those corresponding passages as is required to provide the desired cooling air properties of the example turbine blade 62.

Accordingly, the example turbine blade includes features that reduce restrictions to airflow in some of the passages while restricting airflow in other passage to optimize cooling airflow along the airfoil 70.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An airfoil assembly for a gas turbine engine comprising:
   a platform portion defining a portion of a gas flow path;
   an airfoil extending from the platform including a plurality of cooling air channels;
   a root portion for attachment of the airfoil, the root portion including a bottom surface including a bottom area and a plurality of inlets for communicating air to the plurality of cooling air channels, wherein the plurality of inlets define a total inlet area such that a ratio of the total inlet area to the bottom area is between 0.20 and 0.45, wherein the plurality of inlets includes open inlets and metered inlets, the metered inlets including a metering plate with a plurality of meter openings attached over the metered inlets.

2. The airfoil assembly as recited in claim 1, wherein the ratio of the total inlet area to the bottom area is between 0.25 and 0.40.

3. The airfoil assembly as recited in claim 1, wherein at least one of the plurality of inlets includes an opening area at the bottom surface greater than a passage area spaced apart from the opening area.

4. The airfoil assembly as recited in claim 1, wherein the plurality of metered openings defines a metered opening area and a ratio of the metered opening area to the total inlet area is between 0.7 and about 0.9.

5. The airfoil assembly as recited in claim 1, wherein the bottom surface is bounded between first and second sides that extend between forward and aft sides.

6. The airfoil assembly as recited in claim 5, wherein the bottom forward and aft sides are disposed at a non-normal angle relative to plane perpendicular to an axis of the gas turbine engine.

7. The airfoil assembly as recited in claim 1, wherein the airfoil assembly comprises a turbine blade supported within a turbine rotor.

8. A gas turbine engine comprising:
   a compressor section disposed about an axis;
   a combustor in fluid communication with the compressor section;
   a turbine section in fluid communication with the combustor and driving the compressor section; and
   a turbine blade supported within the turbine section, the turbine blade including a platform portion defining a portion of a gas flow path, an airfoil extending from the platform including a plurality of cooling passages, and a root portion for attachment of the turbine blade, the root portion including a bottom surface including a bottom area and a plurality of inlets communicating with the plurality of cooling passages, wherein the plurality of inlets define a total inlet area such that a ratio of the total inlet area to the bottom area is between 0.20 and 0.45, wherein the plurality of inlets includes open inlets and metered inlets, the metered inlets including a metering plate with a plurality of meter openings attached over the metered inlets.

9. The gas turbine engine as recited in claim 8, wherein at least one of the plurality of inlets includes an opening area at the bottom surface greater than a passage area spaced apart from the opening area.

10. The gas turbine engine as recited in claim 8, wherein the plurality of metered openings define a metered opening area and a ratio of the metered opening area to the total inlet area is between 0.7 and 0.9.

11. The gas turbine engine as recited in claim 8, wherein the bottom surface is bounded between first and second sides that extend between forward and aft sides.

12. The gas turbine engine as recited in claim 11, wherein the bottom forward and aft sides are disposed at a non-normal angle relative to plane perpendicular to the axis of the gas turbine engine.

13. A method of manufacturing a turbine blade comprising:
   generating a turbine blade structure including a root portion, a platform and an airfoil extending from the platform;
   forming a plurality of cooling air passages within the airfoil;
   forming a plurality of inlets through a bottom surface of the root portion for supplying the plurality of cooling air passages, wherein at least one of the inlets is formed to include a bell mouthed opening, and forming the plurality of inlets includes defining the bell mouth with a first opening area at the bottom surface that is greater than an area of one the passages spaced apart from the bottom surface; and
   attaching a metering plate over at least one of the plurality of inlets to define a metered area, with a ratio of the metered area to a total inlet area being between 0.7 and 0.9.

14. The method of manufacturing a turbine blade as recited in claim 13, wherein the bottom surface includes a surface area and the plurality of inlets define the total inlet area, with a ratio of the total inlet area and the bottom area being between 0.20 and 0.45.

* * * * *